(12) United States Patent
Mansour

(10) Patent No.: US 7,620,675 B1
(45) Date of Patent: Nov. 17, 2009

(54) IMAGE AND AUDIO TRANSFORM METHODS

(75) Inventor: Mohamed F. Mansour, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 848 days.

(21) Appl. No.: 11/234,254

(22) Filed: Sep. 23, 2005

Related U.S. Application Data

(60) Provisional application No. 60/612,388, filed on Sep. 23, 2004.

(51) Int. Cl.
*G06F 17/14* (2006.01)
*G06F 15/00* (2006.01)

(52) U.S. Cl. .................. 708/400; 708/402; 708/403

(58) Field of Classification Search ........................ None
See application file for complete search history.

(56) References Cited

OTHER PUBLICATIONS

Narashima et al,"On the Computation of the Discrete Cosine Transform", IEEE Trans., vol. 26, No. 6, pp. 934-936, Jun. 1978.*
Vetterli, "Fast 2-D Discrete Cosine Transform", Proc. IEEE Int. Conf. Acoustics, Speech, Signal Processing (ICASSP), vol. 10, pp. 1538-1541, 1985.*
Diab et al, "A New IDCT-DFT Relationship Reducing the IDCT Computational Cost", IEEE Trans., Signal Processing, vol. 50, No. 7, pp. 1681-1684, Jul. 2002.*

* cited by examiner

*Primary Examiner*—David R Hudspeth
*Assistant Examiner*—Samuel G Neway
(74) *Attorney, Agent, or Firm*—Mirna G. Abyad; Wade J. Brady, III; Frederick J. Telecky, Jr.

(57) ABSTRACT

Inverse discrete cosine transform (type-III DCT), used in video/image and audio coding, is implemented in the form of FFT to lower computational complexity.

7 Claims, 7 Drawing Sheets

IMAGE AND AUDIO TRANSFORM METHODS

CROSS-REFERENCE TO RELATED APPLICATIONS

This application claims priority from provisional application No. 60/612,388, filed Sep. 23, 2004. The following coassigned patent applications disclose related subject matter: application Ser. No. 11/120,365, filed May 2, 2005, and Ser. No. 11/234,365.

BACKGROUND OF THE INVENTION

The present invention relates to digital signal processing, and more particularly to transform processing in audio/visual coding.

Processing of digital audio and video/image signals typically includes both transformation of the signals into frequency domains and reliance upon redundancies or psychoacoustic effects in order to reduce the number of bits used to encode the signals. Indeed, video coding standards such as MPEG-1, MPEG-2, MPEG-4, and H.263 use the hybrid video coding technique of block motion compensation plus transform coding. Block motion compensation is used to remove temporal redundancy between successive images (frames) by block predictions, whereas transform coding is used to remove spatial redundancy within each frame or within the prediction errors. FIGS. 2a-2b illustrate H.264/AVC video coding functions which include a deblocking filter within the motion compensation loop to limit artifacts created at block edges.

Thus a video frame can be encoded as its motion vectors plus corresponding prediction error blocks which are transformed, quantized, and entropy encoded. The transform of a block converts the pixel values of a block from the spatial domain into a frequency domain for quantization; this takes advantage of decorrelation and energy compaction of transforms such as the two-dimensional discrete cosine transform (DCT) or an integer transform approximating a DCT. For example, in MPEG and H.263, 8×8 blocks of DCT-coefficients are quantized, scanned into a one-dimensional sequence, and coded by using variable length coding (VLC). H.264 uses an integer approximation to a 4×4 DCT. Note that accurate nomenclature calls the DCT a type-II DCT, and the inverse DCT a type-III DCT.

Similarly, MPEG-1 audio coding standards such as Levels I, II, and III (MP3) apply an analysis filter bank to incoming digital audio samples to transform the signals into 32 frequency subbands and then within each of the subbands quantize the frequency-domain signal based upon psychoacoustic processing; see FIG. 2c. FIG. 2d shows the decoding including inverse quantization and a synthesis filter bank.

The MPEG-2 advanced audio coding (AAC) extends MP3 to larger sample windows and higher resolution in the frequency domain.

The MPEG-4 general audio coding (GA) standard enhances AAC with further capabilities such as spectral band replication (SBR) which extends low frequency bands to higher frequencies in a decoder and thereby reduces the number of bits required for encoding. FIGS. 3a-3b show functional blocks of an encoder and a decoder, respectively, which include PNS (perceptual noise substitution), TNS (temporal noise shaping), TwinVQ (transform-domain weighted interleaved vector quantization), M/S (conversion of spectra pairs from Mid/Side to Left/Right), and BSAC (bit sliced arithmetic coding).

The SBR block (FIG. 3c) has its own filter banks for analysis filtering into 32 frequency bands and, after high frequency band generation, inverse filtering 64 frequency bands back to the time domain. Modified discrete cosine transform (MDCT) and inverse MDCT (IMDCT) are used for the analysis and synthesis filter banks for low-power SBR. U.S. Pat. No. 6,680,972 describes SBR.

Pan, A Tutorial on MPEG/Audio, 2 IEEE Multimedia 60 (1995) describes the MPEG/audio Layers I, II, and III coding. Konstantinides, Fast Subband Filtering in MPEG Audio Coding, 1 IEEE Signal Processing Letters 26 (1994) and Chan et al, Fast Implementation of MPEG Audio Coder Using Recursive Formula with Fast Discrete Cosine Transforms, 4 IEEE Transactions on Speech and Audio Processing 144 (1996) both disclose reduced computational complexity implementations of the filter banks in MPEG audio coding.

However, the computational complexity of the transforms used are a problem for low power devices.

SUMMARY OF THE INVENTION

The present invention provides transform digital signal processing, such as in audio/visual coding, using DFT and odd-DFT to yield type-III DCT.

DESCRIPTION OF THE PREFERRED EMBODIMENTS

1. Overview

Figure 1:
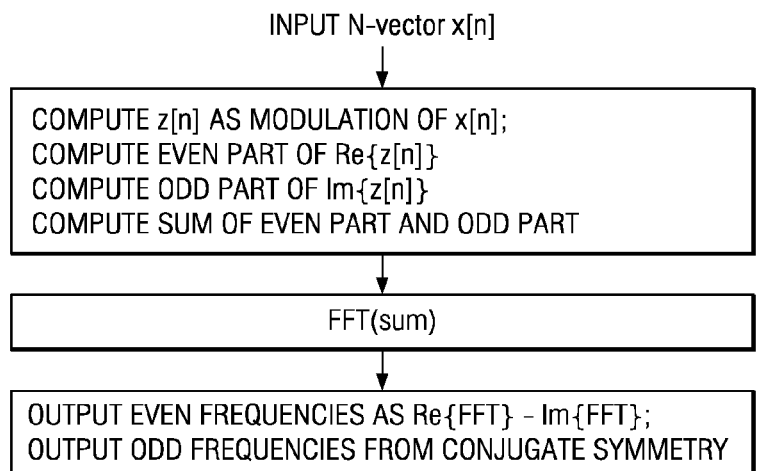
FIG. 1 is a preferred embodiment flowchart.
Figure 2A:
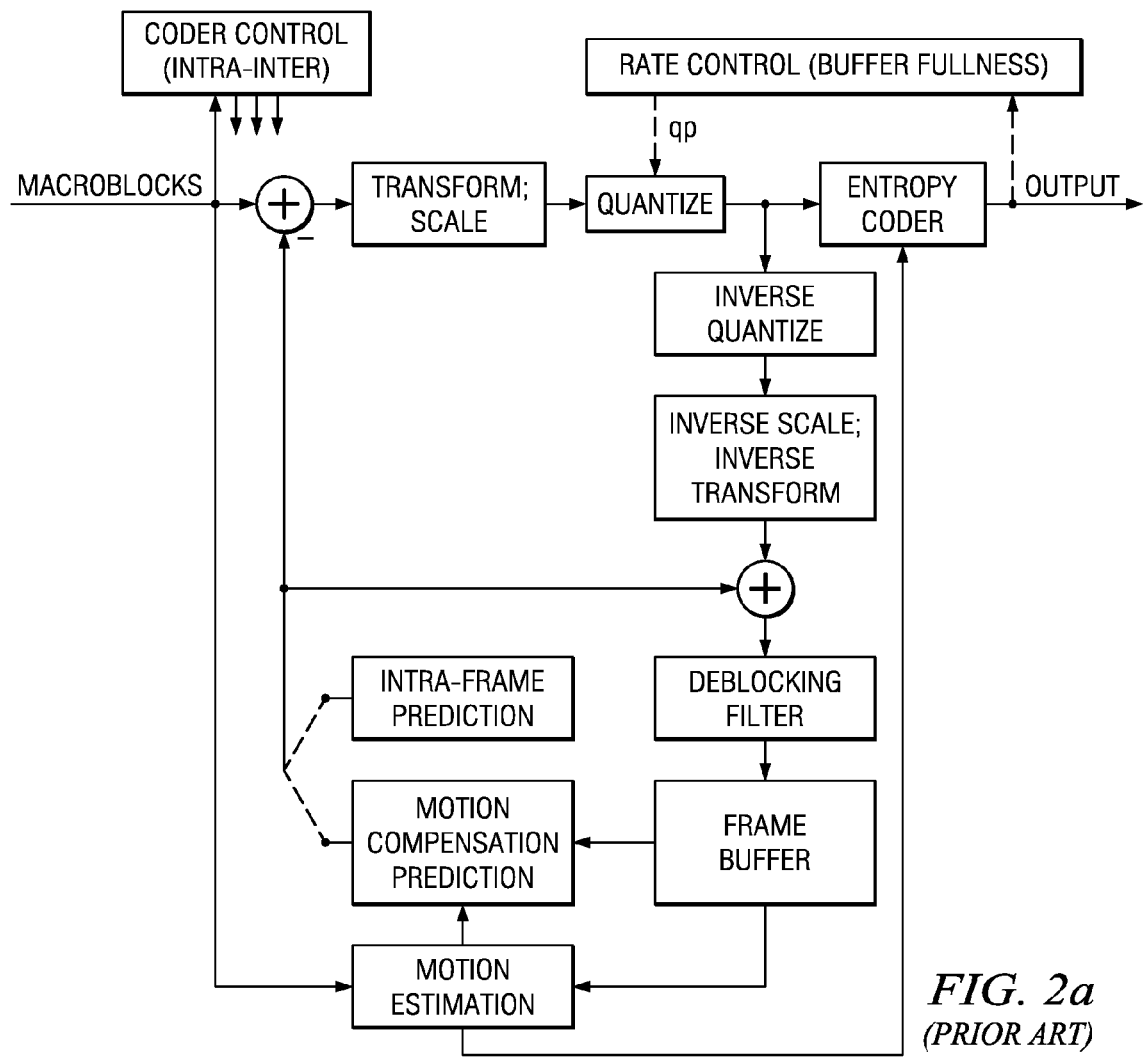
FIGS. 2a-2d show video and audio coding.
Figure 2B:
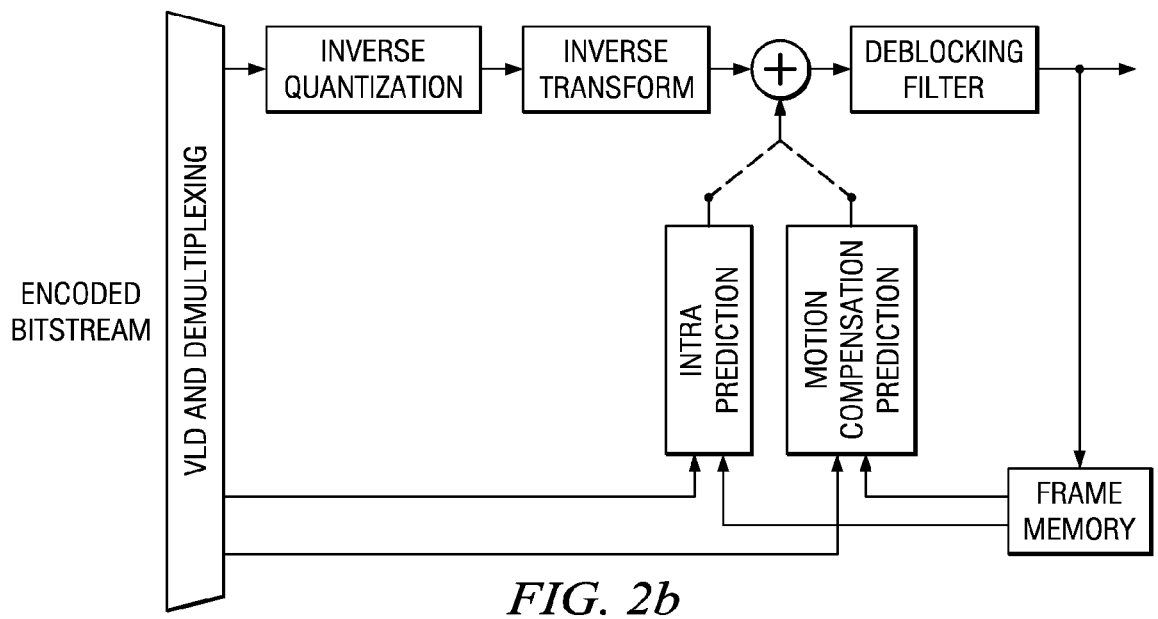
Figure 2C:
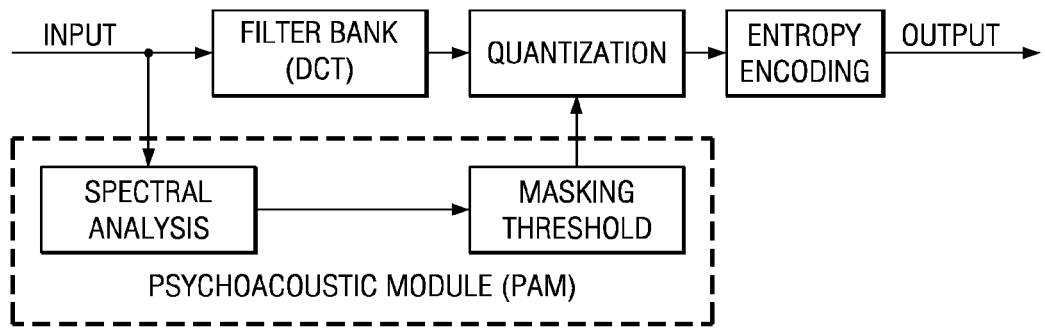
Figure 2D:
Figure 3A:
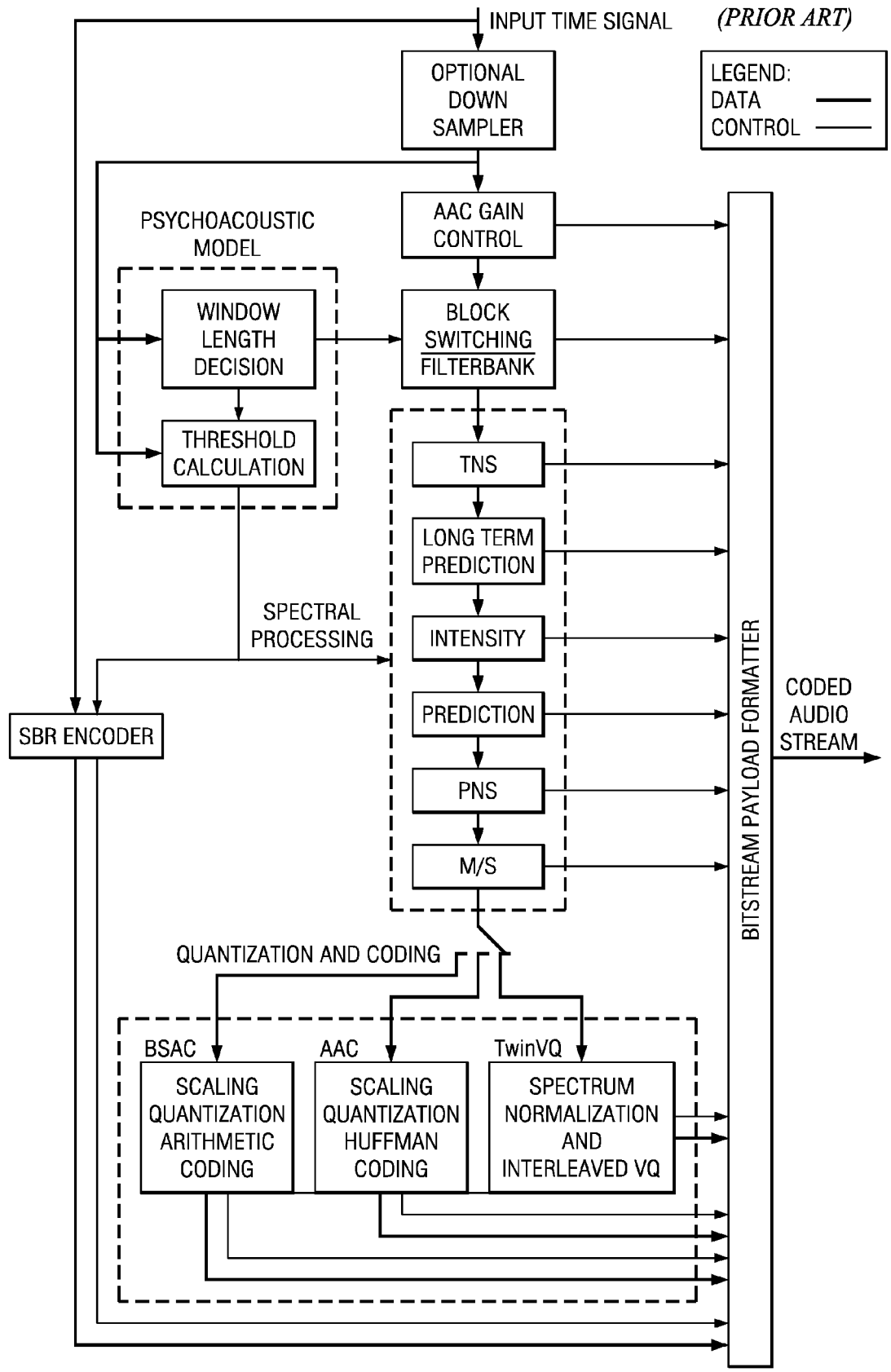
FIGS. 3a-3d show AAC plus SBR coding.
Figure 3B:
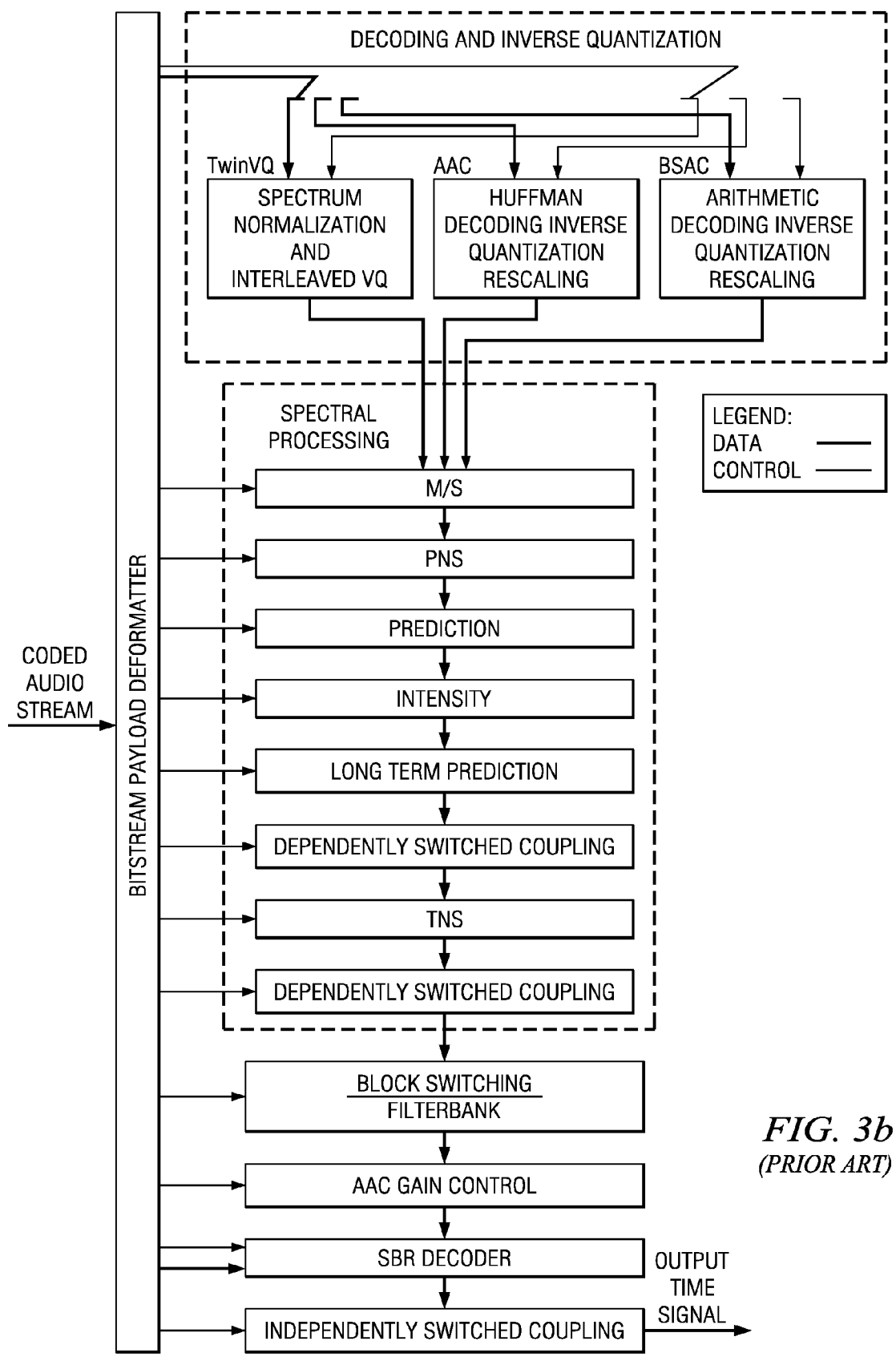
Figure 3C:
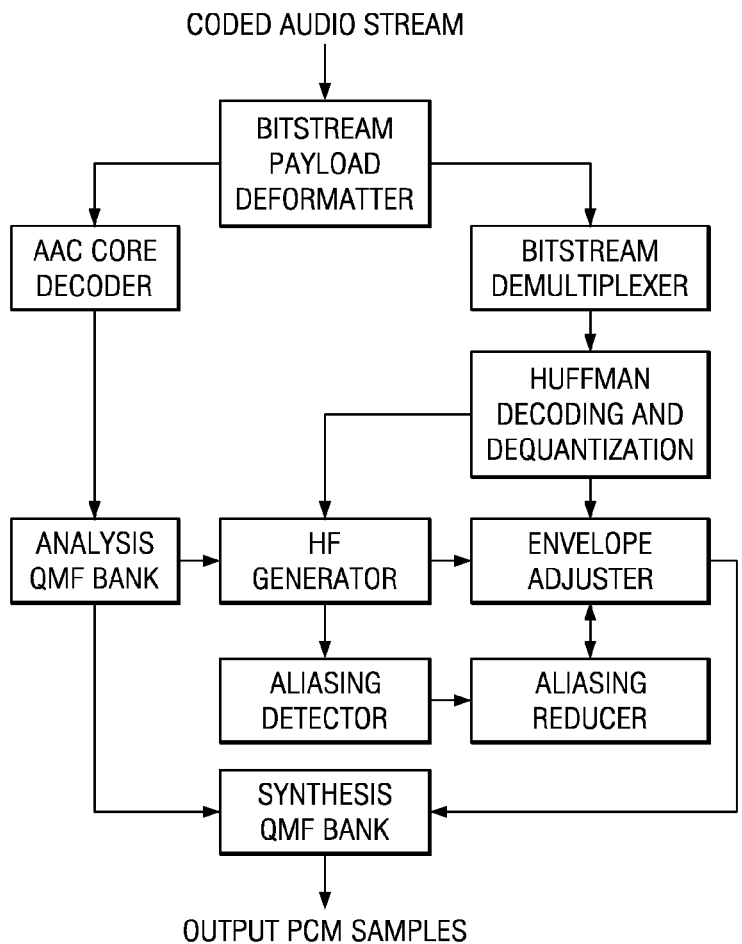

Preferred embodiment methods implement type-III discrete cosine transform (DCT) with a complex FFT of half the size; FIG. 1 is a flowchart. This has applications to video decoding (inverse DCT) and to modified discrete cosine transform (MDCT) filter bank of the type used in audio coding such as MP3, AAC, and AAC plus SBR.

Figure 4B:
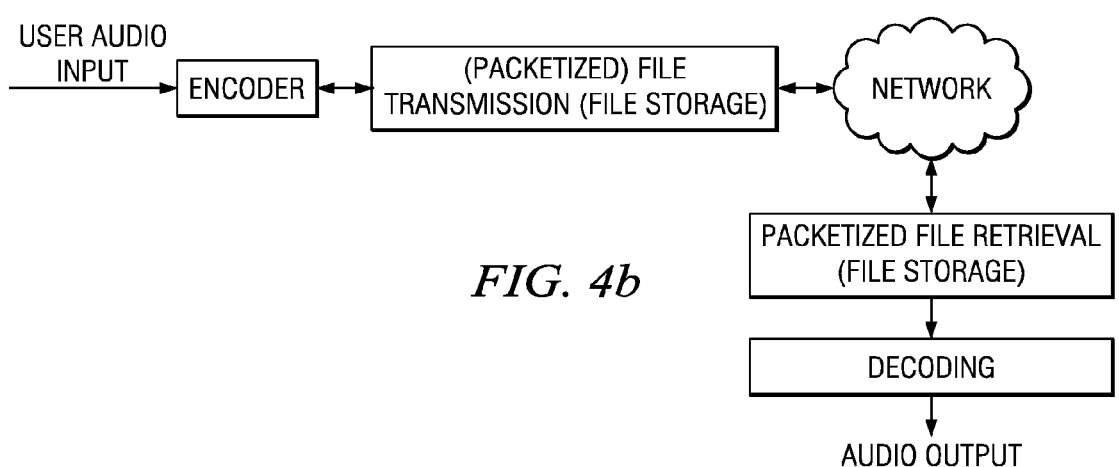
FIGS. 4a-4b illustrate a processor and network communication.
Figure 4A:
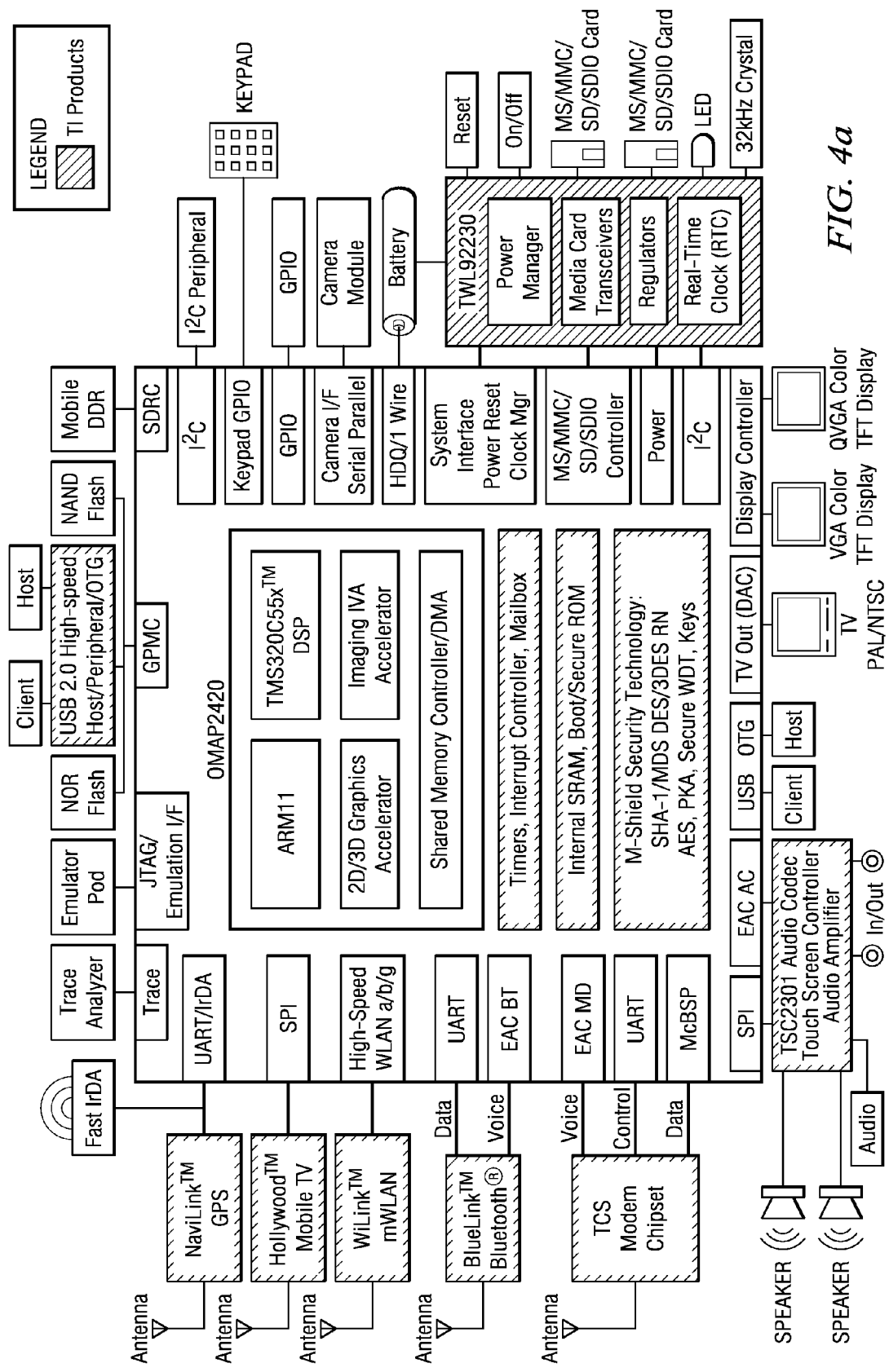

Preferred embodiment systems (such as audio/video coders, cell phones and digital cameras with video clip and audio coding capabilities, et cetera) perform preferred embodiment methods with any of several types of hardware: digital signal processors (DSPs), general purpose programmable processors, application specific circuits, or systems on a chip (SoC) which may have multiple processors such as combinations of DSPs, RISC processors, plus various specialized programmable accelerators; see FIG. 4a as a processor example. A stored program in an onboard or external (flash EEP) ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet; see FIG. 4b.

2. Transform Preliminaries

Preliminarily, consider the relation of the discrete cosine transform (DCT) and the discrete Fourier transform (DFT); the DFT can be implemented very efficiently as the fast Fourier transform (FFT). In particular, for a block of N real-valued samples, $x[n]$ for $0 \leq n \leq N-1$, define the (real-valued) type-II DCT $X_{DCT,N}[k]$ with $0 \leq k \leq N-1$ of $x[n]$ as:

$$X_{DCT,N}[k] = c(k) \sum_{0 \leq n \leq N-1} x[n] \cos(\pi k(n+\tfrac{1}{2})/N)$$

where c(k) is a normalization equal to 1 for all k except $c(0)=1/\sqrt{2}$ (this arises because the average of $\cos^2(\ )$ is ½). Note that the cosine argument with the +½ is the summation index for type-II DCT; for the inverse DCT (IDCT), which is a type-III DCT, the terms look the same but the summation is over the index without the +½.

Similarly, for a block of M samples x[m] for $0 \leq m \leq M-1$, define $X_M[i]$ and $X_{odd,M}[i]$ for $0 \leq i \leq M-1$, the M-point DFT and the M-point odd-DFT, respectively, of x[m] as:

$$X_M[i] = \sum_{0 \leq n \leq M-1} x[n]e^{-j2\pi ni/M}$$

$$= \sum_{0 \leq n \leq M-1} x[n]W_M^{ni}$$

and $$X_{odd,M}[i] = \sum_{0 \leq m \leq M-1} (x[m]e^{-j2\pi m/2M})e^{-j2\pi mi/M}$$

$$= \sum_{0 \leq m \leq M-1} (x[m]W_M^{m/2})W_M^{mi}$$

where $W_M$ is the usual abbreviation for the exponential $e^{-j2\pi/M}$. Note that the M-point odd-DFT of x[m] looks like the odd frequency components of the 2M-point DFT of x[m] after x[m] has been extended to length 2M by padding with M 0s; this follows simply from $W_M^{n/2}=W_{2M}^n$ and $W_M^n=W_{2M}^{2n}$. More explicitly, let f[m]=x[m] for $0 \leq m \leq M-1$ and f[m]=0 for $M \leq m \leq 2M-1$, and let $F_{2M}[i]$ be the 2M-point DFT of f[m]; then $X_M[i]=F_{2M}[2i]$ and $X_{odd,M}[i]=F_{2M}[2i+1]$ for $0 \leq i \leq M-1$.

Also, for real-valued x[m] the M-point odd-DFT is symmetric about (M−1)/2 in that for $0 \leq i \leq M-1$:

$$X_{odd,M}[i]=X_{odd,M}[M-1-i]^*$$

The complexity analysis below presumes the sample block sizes are powers of 2, so the DFTs can be computed by FFT methods such as split radix-2/4.

3. First Preferred Embodiment

First preferred embodiment methods calculate an M-point inverse DCT (IDCT, a type-III DCT) using an M/2-point complex DFT (which can be implemented as an FFT) by exploiting the symmetry features of the odd-DFT and the real DFT.

Start with the definition of the M-point IDCT for a block of M real-valued samples, x[n] for $0 \leq n \leq M-1$, and $0 \leq k \leq M-1$ the transform variable:

$$X_{IDCT,M}[k]=\Sigma_{0 \leq n \leq M-1}c[n]3 \cos(\pi n(k+½)/M)$$

Again, c(n) is a normalization equal to 1 for all n except $c(0)=1/\sqrt{2}$. Note that the sum is over the cosine argument without the +½ for the type-III DCT.

Next, express the cosine as the real part of an exponential $$\cos(\pi n(k+1/2)/M) = \text{Re}\{e^{-j2\pi n(k+1/2)/2M}\}$$

$$= \text{Re}\{W_{2M}^{n/2}W_{2M}^{nk}\}$$

Thus using the fact that the c(n)x[n] are real-valued gives:

$$X_{IDCT,M}[k]=\text{Re}\{Y_{odd,2M}[k]\}$$

where $Y_{odd,2M}[k]$ is the 2M-point odd-DFT transform of real-valued y[n] where y[n]=c(n)x[n] for $0 \leq n \leq M-1$ and y[n]=0 for $M \leq n \leq 2M-1$:

$$Y_{odd,2M}[i] = \sum_{0 \leq n \leq 2M-1} (y[n]W_{2M}^{n/2})W_{2M}^{in}$$

$$= \sum_{0 \leq n \leq M-1} (c(n)x[n]W_{2M}^{n/2})W_{2M}^{in}$$

Now, the symmetry of the 2M-point odd-DFT for real-valued samples applies because y[n] is real-valued, and so for $0 \leq i \leq 2M-1$:

$$Y_{odd,2M}[i]=Y_{odd,2M}[2M-1-i]^*$$

Thus, instead of calculating the transform $Y_{odd,2M}[k]$ for $0 \leq k \leq M-1$ and taking the real part to get $X_{IDCT,M}[k]$, the preferred embodiment methods calculate the transform only for even coefficients ($Y_{odd,2M}[2k]$ for $0 \leq k \leq M-1$) and use the symmetry property to get the odd coefficients: $Y_{odd,2M}[2k+1]=Y_{odd,2M}[2M-2-2k]^*$. This allows the use of a simple calculation of the even coefficients in terms an M-point complex DFT (implemented as an FFT) to provide the transform.

In particular, use the fact that y[n]=0 for $M \leq n \leq 2M-1$ and $W_{2M}^{2k}=W_M^k$ to have:

$$Y_{odd,2M}[2k] = \sum_{0 \leq n \leq 2M-1} (y[n]W_{2M}^{n/2})W_{2M}^{2kn}$$

$$= \sum_{0 \leq n \leq M-1} (y[n]W_{2M}^{n/2})W_M^{kn}$$

$$= \sum_{0 \leq n \leq M-1} z[n]W_M^{kn}$$

$$= Z_M[k]$$

where z[n] is the complex-valued sequence for $0 \leq n \leq M-1$ defined as:

$$z[n] = y[n]W_{2M}^{n/2}$$

$$= c(n)x[n]W_{2M}^{n/2}$$

$$= c(n)x[n]\cos(\pi n/2M) + jc(n)x[n]\sin(\pi n/2M)$$

$$= z_R[n] + jz_I[n]$$

where $z_R[n]$ and $z_I[n]$ are the real and imaginary parts of z[n]. Hence, for $0 \leq 2k \leq M-1$ $$X_{IDCT,M}[2k] = \text{Re}\{Y_{odd,2M}[2k]\}$$

$$= \text{Re}\{Z_M[k]\}$$

And using the odd-DFT symmetry $$X_{IDCT,M}[2k+1] = \text{Re}\{Y_{odd,2M}[2k+1]\}$$
$$= \text{Re}\{Y_{odd,2M}[2M-2-2k]^*\}$$
$$= \text{Re}\{Y_{odd,2M}[2M-2-2k]\}$$
$$= \text{Re}\{Z_M[M-1-k]\}$$

However, the DFT of z[n] is a DFT of a complex sequence, so consider real and imaginary parts to simplify. Now generally, if f[m] is real-valued with the M-point DFT $F_M[k]$, then the even part of f[m] transforms to $\text{Re}\{F_M[k]\}$ and the odd part of f[m] transforms to $j\text{Im}\{F_M[k]\}$. Therefore, consider the even part of $z_R[n]$ and the odd part of $z_I[n]$ (both of which are real-valued) with the definitions:

$$u[n] = \text{even}\{z_R[n]\}$$
$$v[n] = \text{odd}\{z_I[n]\}$$

That is, $u[n]=(z_R[n]+z_R[M-n])/2$ for $1 \leq n \leq M-1$ together with $u[0]=z_R[0]$, and $v[n]=(z_I[n]-z_I[M-n])/2$ for $1 \leq n \leq M-1$ together with $v[0]=0$. Let the M-point DFTs of u[n] and v[n] be denoted $U_M[k]$ and $V_M[k]$, respectively. Thus $U_M[k]$ is real-valued and $V_M[k]$ is imaginary-valued, and we have:

$$X_{IDCT,M}[2k] = \text{Re}\{Z_M[k]\}$$
$$= U_M[k] - jV_M[k]$$

Indeed, $z[n]=z_R[n]+j\ z_I[n]=\text{even}\{z_R[n]\}+\text{odd}\{z_R[n]\}+j\ \text{even}\{z_I[n]\}+j\ \text{odd}\{z_I[n]\}$ and the terms $\text{even}\{z_R[n]\}+j\ \text{odd}\{z_I[n]\}$ give the real-part of $Z_M[k]$ and the terms $\text{odd}\{z_R[n]\}+j\ \text{even}\{z_I[n]\}$ give the imaginary part of $Z_M[k]$.

Define the real-valued sequence g[n] for $0 \leq n \leq M-1$:

$$g[n] = u[n] + v[n]$$

so u[n] is the even part of g[n] and v[n] is the odd part of g[n]. Hence, with $G_M[k]$ the M-point DFT of real-valued g[n]: $U_M[k]=\text{Re}\{G_M[k]\}$ and $V_M[k]=j\ \text{Im}\{G_M[k]\}$. Therefore:

$$X_{IDCT,M}[2k] = \text{Re}\{G_M[k]\} - \text{Im}\{G_M[k]\}$$

Of course, the M-point DFT of real-valued g[n] can be recast as an M/2-point DFT of a complex-valued sequence and implemented as an FFT.

Lastly, the odd components of the type-III DCT are:

$$X_{IDCT,M}[2k+1] = \text{Re}\{Z_M[M-1-k]\}$$
$$= U_M[M-1-k] - jV_M[M-1-k]$$
$$= \text{Re}\{G_M[M-1-k]\} - \text{Im}\{G_M[M-1-k]\}$$

Thus the overall preferred embodiment method includes the following steps:

a) compute real-valued $z_R[n]$ from input real-valued x[n] for $0 \leq n \leq M-1$ by $z_R[n]=c(n)x[n]\cos(\pi n/2M)$ where c(n)=1 for all n except $c(0)=1/\sqrt{2}$.

b) compute real-valued $z_I[n]$ from the same input x[n] for $0 \leq n \leq M-1$ by $z_I[n]=x[n]\sin(\pi n/2M)$; note that $z_I[0]=0$ because sin(0)=0.

c) compute u[n] from $z_R[n]$ for $0 \leq n \leq M-1$ by $u[n]=(z_R[n]+z_R[M-n])/2$ for $1 \leq n \leq M-1$ together with $u[0]=z_R[0]$.

d) compute v[n] from $z_I[n]$ for $0 \leq n \leq M-1$ by $v[n]=(z_I[n]-z_I[M-n])/2$ for $1 \leq n \leq M-1$ together with $v[0]=0$.

e) compute (real-valued) g[n] for $0 \leq n \leq M-1$ by $g[n]=u[n]+v[n]$.

f) compute $G_M[k]$ as the M-point DFT of real g[n]; this can be implemented as an M/2-point complex DFT.

g) compute $X_{IDCT,M}[2k]=\text{Re}\{G_M[k]\}-\text{Im}\{G_M[k]\}$ for $0 \leq k \leq M/2-1$.

h) compute $X_{IDCT,M}[2k+1]=\text{Re}\{G_M[M-1-k]\}-\text{Im}\{G_M[M-1-k]\}$ for $0 \leq k \leq M/2-1$.

4. Complexity Analysis

The first preferred embodiment method requires 2M multiplications and M additions to calculate z[n], M additions to calculate u[n] and v[n], M additions to calculate g[m], a real M-point FFT to find $G_M[k]$, and M additions to calculate $X_{IDCT,M}[2k]$ from the real and imaginary parts of $G_M[k]$. Therefore the overall complexity is M/2 ($\log_2 M+1$) multiplications and 3M/2 ($\log_2 M+1$) additions.

5. Preferred Embodiment Applications

Figure 3D:
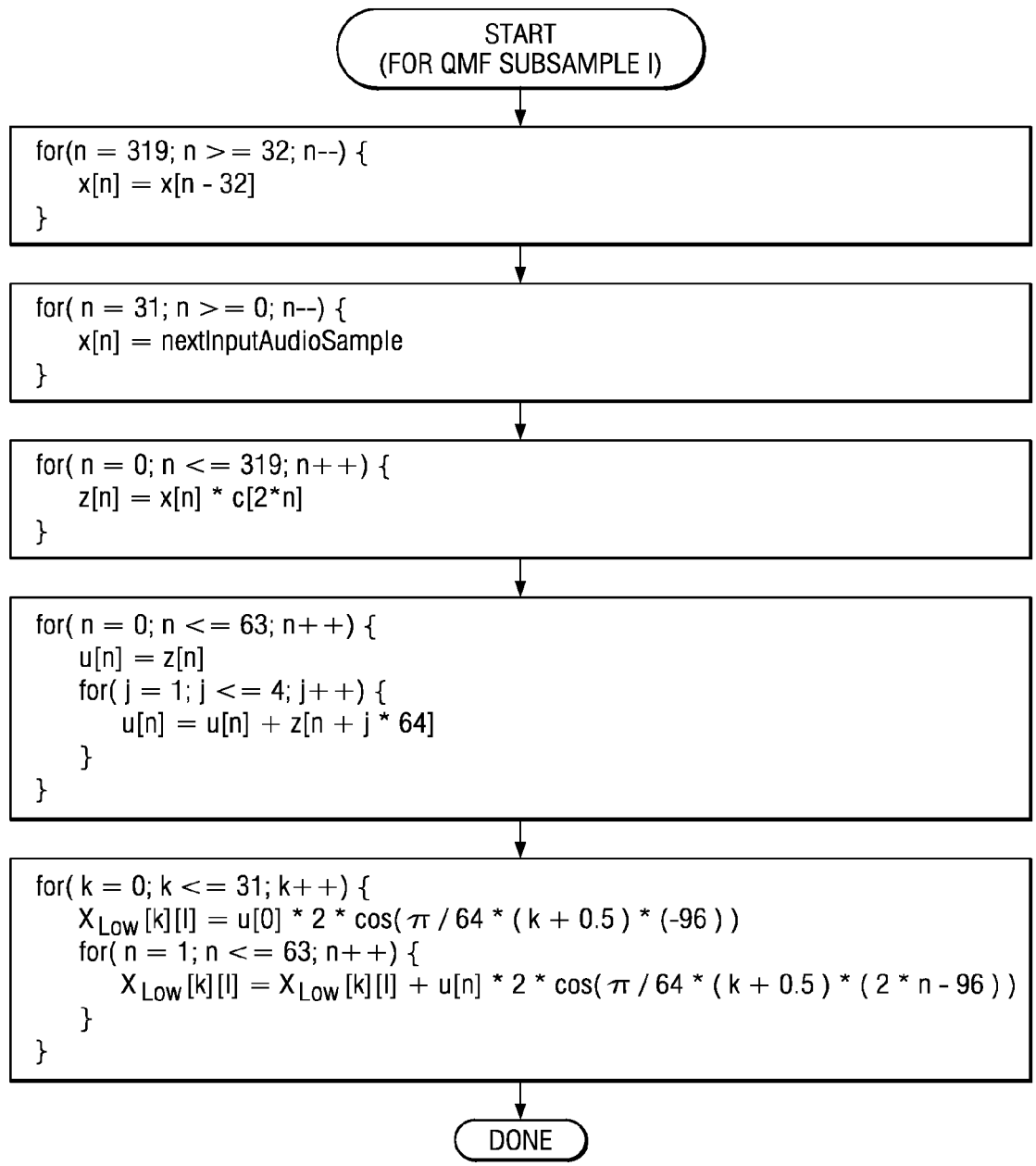

The preferred embodiment methods of type-III DCT computation can be applied to video/image and audio coding. In particular, for AAC Plus encoding with low-power SBR, the SBR filter bank is used to split the time domain signal from the core AAC decoder into 32 subband signals. The outputs from the filter bank, i.e., the subband samples, are real-valued and critically sampled. The flowchart of the filter bank operation is given in FIG. 3d. The filtering involves the following steps, where an array x consisting of 320 time domain input samples is assumed. A higher index into the array corresponds to older samples.

a) Shift the samples in the array x by 32 positions; the oldest 32 samples are discarded and 32 new samples are stored in positions 0 to 31.

b) Multiply the samples of array x by every other coefficient of window c to give array z (320 samples). The 640 c coefficients can be found in Table 4.A.87 of the MPEG4 GA standard; c roughly has a sinx/x form with a main lobe 211 samples wide centered at sample 320 plus small side lobes but with everything multiplied by a sign change at every 128 samples.

c) Sum (stack) the samples according to u[n]=z[n]+z[64+n]+z[128+n]+z[192+n]+z[256+n] to create the 64-element array u.

d) Calculate new 32 subband samples by the 32×64 matrix operation M,u, where the matrix elements are $M_r(k,n)=2\cos[\pi(k+\frac{1}{2})(2n-96)/64]$ for the index ranges $0 \leq k \leq 32$ and $0 \leq n \leq 64$.

Every loop in the flowchart produces 32 subband samples, each representing the output from one filter bank subband.

Now the 32×64 MDCT operation of step (d) can be converted into a 32×32 type-III DCT by reworking the array u (reindexing and restacking). In particular, $\cos[\pi(k+\frac{1}{2})(2n-96)/64]$ is symmetric about n=48; thus define y[m]=u[48+m]+u[48-m] (using trigonometric periodicity for index values out of range). This allows use with the preferred embodiment method for 32-point type-III DCT computation in terms of a 32-point FFT.

6. Modifications

The preferred embodiments can be modified in various ways while retaining the feature of implementing a type-III DCT with an FFT.

For example, in generating the even and odd parts (steps (c) and (d) of the preferred embodiment), we may only compute it for $1 < n \leq M/2-1$, and exploit the symmetry to generate the second half.

What is claimed is:

1. A method of audio analysis filter bank operation of a digital signal processor, comprising the steps of:
   (a) receiving in the digital signal processor a block of N audio samples where N is a positive integer;
   (b) including said block in an array of prior samples;
   (c) windowing said array of samples;
   (d) symmetric summing said array to form an N-vector $S_n$ for n=0, 1, ..., N-1;
   (e) effecting a matrix multiplication and outputting $V_i$, wherein $V_i = \Sigma_{0 \leq n \leq N-1} M_{i,n} S_n$, for i=0, 1, ..., N-1, where the matrix elements are $M_{i,n} = \cos[\pi n(2i+1)/N]$; and
   wherein said matrix multiplication of step (e) includes:
     (i) computing $z_R[n]$ for $0 \leq n \leq N-1$ by: $z_R[n] = c(n) S_n \cos[\pi n/2N]$ where c(n)=1 for all n except $c(0) = 1/\sqrt{2}$;
     (ii) computing $z_1[n]$ for $0 \leq n \leq N-1$ by: $z_1[n] = S_n \sin[\pi n/2N]$;
     (iii) computing u[n] for $0 \leq n \leq N-1$ by: $u[n] = (z_R[n] + z_R[N-n])/2$ for $1 \leq n \leq N-1$ together with $u[0] = z_R[0]$;
     (iv) computing v[n] for $0 \leq n \leq N-1$ by $v[n] = (z_1[n] - z_1[M-n])/2$ for $1 \leq n \leq N-1$ together with $v[0] = 0$;
     (v) computing g[n] for $0 \leq n \leq N-1$ by $g[n] = u[n] + v[n]$;
     (vi) computing G[k] as the N-point DFT of g[n];
     (vii) computing $V_{2k} = \text{Re}\{G[k]\} - \text{Im}\{G[k]\}$ for $0 \leq k \leq N/2-1$; and
     (viii) computing $V_{2k+1} = \text{Re}\{G[N-1-k]\} - \text{Im}\{G[N-1-k]\}$ for $0 \leq k \leq N/2-1$.

2. The method of claim 1, wherein:
   (a) N=32.

3. An audio spectral band reflection analysis filter bank operation, comprising:
   (a) a memory for audio samples;
   (b) array circuitry coupled to said memory, for receiving a block of N audio samples and to window plus sum an array symmetrically including said N audio samples plus audio samples stored in said memory to generate a length-N vector with components $S_0, S_1, ..., S_{N-1}$; and
   (c) transform circuitry coupled to said array circuitry and said memory for effecting a matrix multiplication and outputting $V_i$, wherein $V_i = \Sigma_{0 \leq n \leq N} M_{i,n} S_n$, for i=0, 1..., N-1, wherein the matrix elements are $M_{i,n} = \cos[\pi n(2i+1)/N]$.
   (d) wherein said transform circuitry includes sub-circuitry effecting said matrix multiplication by:
     (i) computing by: $Z_R[n]$ for $0 \leq n \leq N-1$ by: $z_R[n] = c(n) S_n \cos[\pi n/2N]$ where c(n)=1 for all n except $c(0) = 1/\sqrt{2}$;
     (ii) computing $z_1[n]$ for $0 \leq n \leq N-1$ by: $z_1[n] = S_n \sin[\pi n/2N]$;
     (iii) computing u[n] for for $0 \leq n \leq N-1$ by $u[n] = z_R[n] + z_R[N-n]/2$ for $1 \leq n \leq N-1$ together with $u[0] = z_R[0]$;
     (iv) computing v[n] for $0 \leq n \leq N-1$ by $v[n] = z_1[n] - z_1[M-n])/2$ for $1 \leq n \leq N-1$ together with $v[0] = 0$;
     (v) computing g[n] for $0 \leq n \leq N-1$ by $g[n] = u[n] + v[n]$;
     (vi) computing G[k] as the N-point DFT of g[n];
     (vii) computing $V_{2k} = \text{Re}\{G[k]\} - \text{Im}\{G[k]\}$ for $0 \leq k \leq N/2-1$; and
     (viii) computing $V_{2k+1} = \text{Re}\{G[N-1-k]\} - \text{Im}\{G[N-1-k]\}$ for $0 \leq k \leq N/2-1$.

4. The filter bank of claim 3, wherein:
   (a) said transform circuitry and said output circuitry are implemented as a program on a programmable processor.

5. The filter bank of claim 3, wherein:
   (a) N=32.

6. A method of image data inverse DCT operation operation of a digital signal processor, comprising the steps of:
   (a) receiving in the digital signal processor a block of $N^2$ image transform data $S_{n,m}$ where n, m=0, 1, 2 ..... N-1 where N is a positive integer;
   (b) effecting a matrix multiplication and outputting $V_{i,m}$, wherein $V_{i,m}' = \Sigma_{0 \leq n \leq N-1} M_{i,n} S_{n,m}$, for i=0, 1, ..., N-1, wherein the matrix elements are $M_{i,n} = \cos[\pi n(2i+1)/N]$; and
   (c) effecting a matrix multiplication of said $V_{i,m}$ with respect to the m index;
   (d) wherein said matrix multiplication of step (b) includes:
     (i) computing $z_R[n,m]$ for $0 \leq n \leq N-1$ by: $z_R[n,m] = c(n) S_{n,m} \cos[\pi n/2N]$ where c(n)=1 for all n except $c(0) = 1/\sqrt{2}$;
     (ii) computing $z_1[n,m]$ for $0 \leq n \leq N-1$ by: $z_1[n,m] = S_{n,m} \sin[\pi n/2N]$;
     (iii) computing u[n,m] for $0 \leq n \leq N-1$ by: $u[n,m] = (Z_R[n,m] + Z_R[N-n,m])/2$ for $1 \leq n \leq N-1$ together with $u[0,m] = Z_R[0,m]$;
     (iv) computing v[n,m] for $0 \leq n \leq N-1$ by $v[n,m] = (z_1[n,m] - z_1[M-n,m])/2$ for $1 \leq n \leq N-1$ together with $v[0,m] = 0$;
     (v) computing g[n] for $0 \leq n \leq N-1$ by $g[n] = u[n] + v[n]$;
     (vi) computing G[k,m] as the N-point DFT of g[n,m];
     (vii) computing $V_{2k,m} = \text{Re}\{G[k,m]\} - \text{Im}\{G[k,m]\}$ for $0 \leq k \leq N/2-1$; and
     (viii) computing $V_{2k+,m1} = \text{Re}\{G[N-1-k,m]\} - \text{Im}\{G[N-1-1k,m]\}$ for $0 \leq k \leq N/2-1$.

7. The method of claim 6, wherein:
   (a) N=8.

* * * * *

UNITED STATES PATENT AND TRADEMARK OFFICE
CERTIFICATE OF CORRECTION

PATENT NO.      : 7,620,675 B1                                      Page 1 of 1
APPLICATION NO. : 11/234254
DATED           : November 17, 2009
INVENTOR(S)     : Mohamed F. Mansour It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1090 days.

Signed and Sealed this

Twenty-sixth Day of October, 2010

David J. Kappos
*Director of the United States Patent and Trademark Office*